(12) United States Patent
McLean et al.

(10) Patent No.: US 11,550,896 B2
(45) Date of Patent: Jan. 10, 2023

(54) PASSWORD STRENGTH

(71) Applicant: INTERNATIONAL BUSINESS MACHINES CORPORATION, Armonk, NY (US)

(72) Inventors: Leigh S. McLean, Nerang (AU); Narayana Aditya Madineni, Southport (AU); Matthew Green, Ashmore (AU); Michael W. Gray, Guanaba (AU)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/921,981

(22) Filed: Jul. 7, 2020

(65) Prior Publication Data

US 2022/0012327 A1 Jan. 13, 2022

(51) Int. Cl.
*G06F 21/46* (2013.01)
*G06F 21/60* (2013.01)
*G06F 21/36* (2013.01)

(52) U.S. Cl.
CPC .............. *G06F 21/46* (2013.01); *G06F 21/36* (2013.01); *G06F 21/602* (2013.01)

(58) Field of Classification Search
CPC ......... G06F 21/46; G06F 21/36; G06F 21/602
See application file for complete search history.

(56) References Cited

U.S. PATENT DOCUMENTS

| | | | |
|---|---|---|---|
| 10,169,566 B1 | 1/2019 | Mossoba | |
| 2005/0060554 A1* | 3/2005 | O'Donoghue | G06F 21/36 726/19 |
| 2017/0302648 A1* | 10/2017 | Ferrydiansyah | H04L 63/083 |
| 2018/0124034 A1* | 5/2018 | Duvall | H04L 9/3236 |
| 2018/0323966 A1* | 11/2018 | Kanagaraj | H04L 9/0643 |
| 2019/0205889 A1* | 7/2019 | Cantrell | G06Q 20/38215 |
| 2019/0392128 A1* | 12/2019 | Conde | G06N 3/08 |
| 2021/0067328 A1* | 3/2021 | Verheyen | H04L 9/0861 |

(Continued)

OTHER PUBLICATIONS https://www.darkreading.com/risk/images-could-change-the-authentication-picture/d/d-id/1134705?, "Images Could Change The Authentication Picture", Accessed on Apr. 16, 20, 6 pages.

(Continued)

*Primary Examiner* — James R Turchen
(74) *Attorney, Agent, or Firm* — Lily Neff

(57) ABSTRACT

A computer-implemented method, computer system, and computer program product for generation of a password with increased password strength. Embodiments of the present invention may include receiving one or more alphanumeric characters. Embodiments of the present invention may include receiving one or more images. Embodiments of the present invention may include hashing the received one or more images. Embodiments of the present invention may include hashing the one or more alphanumeric characters and the hashed one or more images to generate the password. Embodiments of the present invention may include replacing the one or more alphanumeric characters with the one or more images and sending the generated password to a server. Embodiments of the present invention may include sequencing the one or more images between the one or more alphanumeric characters. The one or more images may be personal photos of a user.

20 Claims, 6 Drawing Sheets

(56) References Cited

U.S. PATENT DOCUMENTS

2022/0141029 A1* 5/2022 Dahmen .................. G06F 8/60 713/176

OTHER PUBLICATIONS

Choudhary, et al., "Authentication Schemes for Session Passwords using Color and Images", IRJET, vol. 4, Issue 6, May 2017, pp. 1087-1090.

Fadhil Al-Husainy, et al., "Using Emoji Pictures to Strengthen the Immunity of Passwords Against Attackers", European Scientific Journal, vol. 11, No. 30, Oct. 2015, pp. 153-165.

Glenn, How to Set Up a Picture Password in Windows 10, Jan. 30, 2017, How-To Geek, 12 pages.

Jansen, et al., "Picture Password: A Visual Login Technique for Mobile Devices", NISTIR 7030, Jul. 2003, pp. 1-20.

Mackie, et al., "A Novel Hybrid Password Authentication Scheme Based on Text and Image", Jul. 2018, pp. 1-18.

Mell et al., "The NIST Definition of Cloud Computing", Recommendations of the National Institute of Standards and Technology, Special Publication 800-145, Sep. 2011, 7 pages.

Pixelpin, "Why should picture passwords replace textual?", Aug. 29, 2018, https://medium.com/@PixelPin/why-should-pictured-passwords-replace-textual-985bf98daee1, pp. 1-4.

Schaub, "Why emojis might be your next password", The Conversation, May 3, 2017, 3 pages.

Singh, et al., "Investigating the Combination of Text and Graphical Passwords for a more secure and usable experience", IJNSA, vol. 3, No. 2, Mar. 2011, pp. 78-95.

Van Oorschot et al., "TwoStep: An Authentication Method Combining Text and Graphical Passwords", ResearchGate, Conference Paper May 2009, pp. 1-7.

* cited by examiner

PASSWORD STRENGTH

BACKGROUND

The present invention relates generally to the field of computing, and more particularly to password strength. Information, such as passwords, are important to a user or a business. For example, passwords may be needed to access different accounts, such as a bank account or an email account. It is generally important for such information to be protected from unauthorized appropriation and subsequent misuse.

BRIEF SUMMARY

Embodiments of the present invention may include a method, computer system, and computer program product for generation of a password with increased password strength. Embodiments of the present invention may include receiving one or more alphanumeric characters. Embodiments of the present invention may include receiving one or more images. Embodiments of the present invention may include hashing the received one or more images. Embodiments of the present invention may include hashing the one or more alphanumeric characters and the hashed one or more images to generate the password. Embodiments of the present invention may include replacing the one or more alphanumeric characters with the one or more images and sending the generated password to a server. Embodiments of the present invention may include sequencing the one or more images between the one or more alphanumeric characters. The one or more images may be personal photos of a user. The one or more images may replace the one or more alphanumeric characters within the password. The one or more images may be added at a beginning of the password, before the one or more alphanumeric characters. The one or more images may also be added at an end of the password, after a last alphanumeric character.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
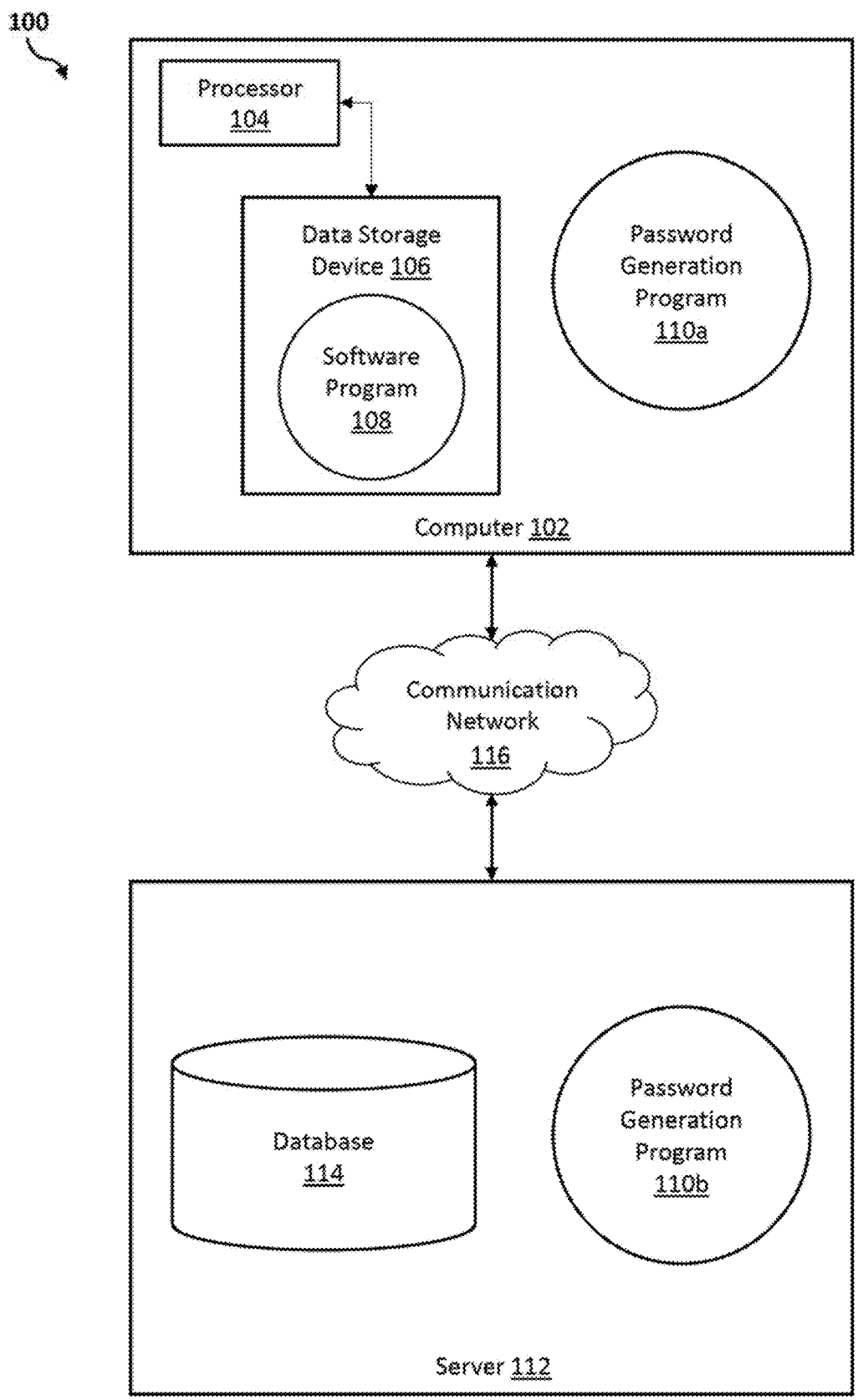
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to passwords. More particularly, embodiments of the present invention provide a method, computer program, and computer system for improving password strength. Passwords may be important to a user or a business. For example, passwords may be needed to access different accounts, such as a bank account, an email account, or a social media account. It is generally important for such information to be protected from unauthorized appropriation and subsequent misuse.

Generally, a password may be a secret word or phrase that may be used to gain admission to something. Password strength refers to a measurement of the effectiveness of a password against guessing or brute force cracking. Therefore, a password's strength may increase with character length, complexity, and unpredictability. For example, stronger passwords are typically longer than weaker passwords. Additionally, strong passwords are typically more complex and use unique strings of characters in place of known phrases.

Typically, the strength of a password may be measured by how many trials an unauthorized, user who does not have access to the password, would need, on average, to guess the password correctly. Password entropy is a measurement of how unpredictable a password is. Password entropy may predict how difficult a given password would be to decipher through guessing, brute force cracking, dictionary attacks, or other common methods. Password entropy may be expressed in terms of bits. As such, a password that is already known may have zero bits of entropy. A password that may be guessed by an unauthorized user on a first attempt half the time may have one bit of entropy. As such, a password's entropy may be calculated by finding the entropy per character, which may be a log base 2 of the number of characters in the character set used, multiplied by the number of characters in the password itself. Therefore, the larger the number of characters in a password, the stronger the password and the larger the password entropy. As such, a recommended user selected password may have 128 bits of entropy or more.

Current techniques of improving password strength may include using a random password generator. A random password generator may automatically generate a password that may have an increase in character length. The randomly generated password may also be unpredictable. However, because of this unpredictability, the randomly generated password may be hard to remember. Oftentimes a user may write down the randomly generated password so that the user does not forget it. Once written down, it may be easy for the randomly generated password to be misappropriated. As such, there exists a need to allow the user to create a password that is easy to remember but is hard to decipher. As such, there exists a need to increase the password strength.

The following described exemplary embodiments provide a system, method, and program product for increasing a password strength. Embodiments of the present invention allow the user to create a strong password that may have at least 30 bits of entropy. As such, embodiments of the present invention have the capacity to improve the technical field of password generation by allowing the user to combine alphanumeric characters with the user's images to generate a unique password. The unique password may be easy to remember yet effective against unauthorized appropriation.

In an embodiment, the user selects one or more alphanumeric characters and one or more images to create a password. The one or more images may be interspersed at any place within the one or more alphanumeric characters. In an embodiment, the one or more images may be hashed such that one or more hashes corresponding with the one or more images may be added to the one or more alphanumeric characters in place of the one or more images. In an embodiment, a second hash may be performed to hash the one or more alphanumeric characters and the one or more hashed images to create a final hash. The final hash may correspond to the created password.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and a password generation program 110a. The networked computer environment 100 may also include a server 112 that is enabled to run a password generation program 110b that may interact with a database 114 and a communication network 116. The networked computer environment 100 may include a plurality of computers 102 and servers 112, only one of which is shown.

The communication network 116 may include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and client computer 102 may include internal components 902b and external components 904b, respectively.

The server 112 may operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud.

The client computer 102 may be, for example, a mobile device, a telephone, a personal digital assistant, a netbook, a laptop computer, a tablet computer, a desktop computer, or any type of computing devices capable of running a program, accessing a network, and accessing a database 114. The client computer 102 may include a user interface (not shown). The user interface may include components used to receive input from a user on the client computer 102 and transmit the input to another client computer and display the information to the user on the client computer 102. For example, the user interface may display an input area where the user may input the user's credentials. For example, the input area may be the area associated with the user's login name and password when the user is attempting to login to the user's email account.

According to various implementations of the present embodiment, the password generation program 110a, 110b may interact with a database 114 that may be embedded in various storage devices, such as, but not limited to a computer 102, such as a mobile device, a networked server 112, or a cloud storage service.

According to an embodiment, a user utilizing a client computer 102 or a server 112 may use the password generation program 110a, 110b (respectively) to generate a password. The method to generate the password is explained in more detail below with respect to FIGS. 2-3.

Figure 2:
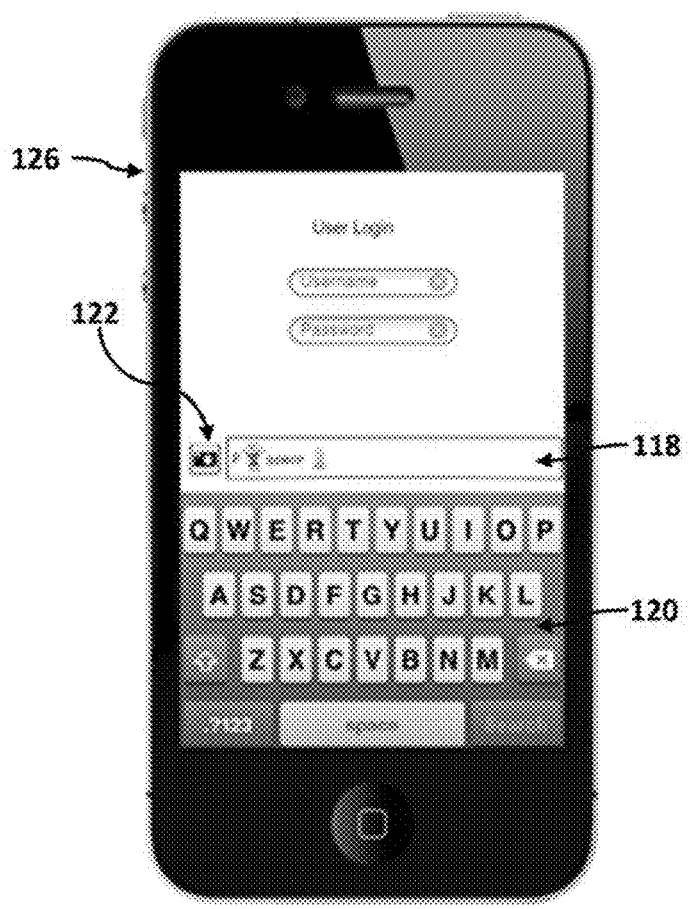
FIG. 2 illustrates a portable electronic device with an example password, in accordance with an embodiment of the invention.
Figure 2:
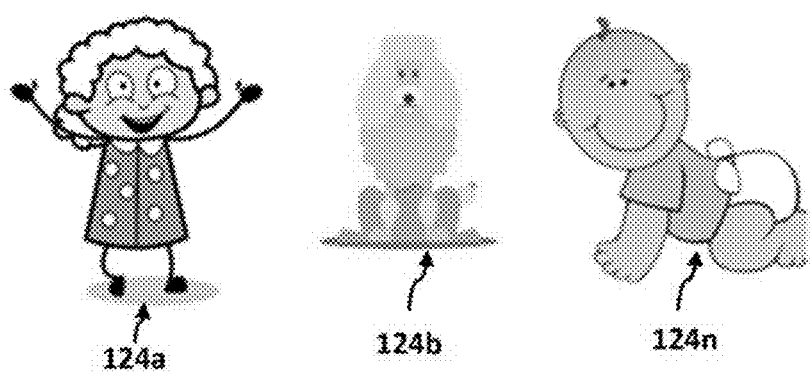

Referring to FIG. 2, a portable electronic device 126 with an example password, in accordance with an embodiment of the invention. The portable electronic device 126 may be a user device, such as, for example, a smart phone. portable electronic device 126 may be an example of the client computer 102, illustrated in FIG. 1. The portable electronic device 126 may include an input area 118. The input area 118 be used to input the user's credentials, such as, for example, a password. The portable electronic device 126 may also include an input surface 120 and an image directory 122. The input surface 120 may be the surface that the user may use to input the user's credentials into the input area 118. The input surface 120 may be a touch-sensitive screen keypad or a keyboard. The sensing mechanism may be a resistive sensing mechanism, a capacitive sensing mechanism, or a mechanical sensing mechanism. The input surface 120 may also be a conventional or mechanical keypad or keyboard that employs physical keys and conventional non-touch screen key actuation mechanisms, such as mechanical or electrical switches.

The image directory 122 may be a directory where a library of images 124a, 124b, 124n resides. The image directory 122 may be located on the user's device, such as, for example, the computer 102, or the server 112, both illustrated in FIG. 1. For example, the image directory 122 may be the user's local pictures folder on the computer 102. The image directory 122 may also be located on the user's cloud storage of a computing deployment model, such as a private cloud, community cloud, public cloud, or hybrid cloud.

In some embodiments, the images 124a-n may include images that the user created. In other embodiments, the images 124a-n may include public images as well as images available only to the user. For example, the images 124a-n may be the user's personal photos or images that the user created himself/herself. The user's personal photos may depict different people, objects, places, etc. Public images may be images 124a-n that the user may have found on the internet.

Embodiments of the present invention allow for the user to create a password that includes both alphanumeric characters and images, for example the images 124a-n. The combination of the alphanumeric characters and the images 124a-n will increase the password entropy thus increasing the password strength.

According to the embodiment illustrated in FIG. 2, both the alphanumeric characters as well as the images 124a-n may be entered into the input area 118 using the input surface 120 and the image directory 122. For example, the user may decide to create a password with two images 124a-n. The user may start typing the password into the input area 118. For example, the password may include the alphanumeric characters "Password" along with two images. The images 124a-n may be substituted for some of the letters in the password. For example, the user may decide to use an image of the user's aunt for the letter "a" and an image of a dog for the letter "d". As a result, the user's password may contain the alphanumeric characters "P" and "sswor", as well as two images, one image of the user's aunt and another image of the user's dog. The images 124a-n may also be paths to the photos, for example a hyperlink to the image directory 122 such as, C:/Users/JSmith/Pictures/Aunty.jpg. Further, to show the photo in the password, the password may contain a thumbnail image of the photo. As such, the password may be: "P  sswor  ".

The user may enter the alphanumeric characters and the images 124a-n in the order in which the alphanumeric characters and the images 124a-n should appear in the password. Optionally, the user may enter all of the alphanumeric characters and subsequently replace some of the alphanumeric characters with the specified images 124a-n.

It should be appreciated that the user may utilize as many images 124a-n as the user likes to create a password. In an embodiment the user may use images 124a-n as a substitute for some of the alphanumeric characters in a password. In an alternative embodiment, the user may use images 124a-n in addition to the alphanumeric characters. Continuing with the example from above, instead of substituting the alphanumeric character "a" with an image of the aunt and the alphanumeric character "d" with an image of a dog, the user may use both the alphanumeric characters "a" and "d" and add the images of the aunt and a dog. As a result, the password may be: "Pa  ssword  ".

The user may add the one or more images 124a-n at any place within the password. For example, the user may add the image 124a-n at the beginning of the password, in the middle of the password, or at the end of the password. For example, the user may decide to create a password using three different images 124a-n. The user decides to put one image at the beginning of the password, one image some- where in the middle of the password, and the third image at the end of the password. Continuing with the example from above, in addition to the alphanumeric character "P", the user may decide to use an image of a penguin. Further, instead of the alphanumeric character "w", the user may decide to use an image of a wagon. In addition, instead of the alphanumeric character "d", the user may decide to use an image of deer. As a result, the password may be:

"  Pass  or  ".

It should be appreciated that the user may create different passwords for different accounts. For example, the user may have a distinct password to log in to the user's bank account and a different password to log into the user's social media account, such as, for example, Facebook®. In an embodiment, the different passwords may include the same alphanumeric characters but have different images 124a-n. In an alternative embodiment, the different passwords may include different alphanumeric characters and different images 124a-n. In yet another embodiment, the different passwords may include the same images 124a-n and different alphanumeric characters. The combination of the alphanumeric characters and the images 124a-n makes the password stronger because the used images 124a-n are available to the user since the images 124a-n may be personal photos that the user created.

Figure 3:
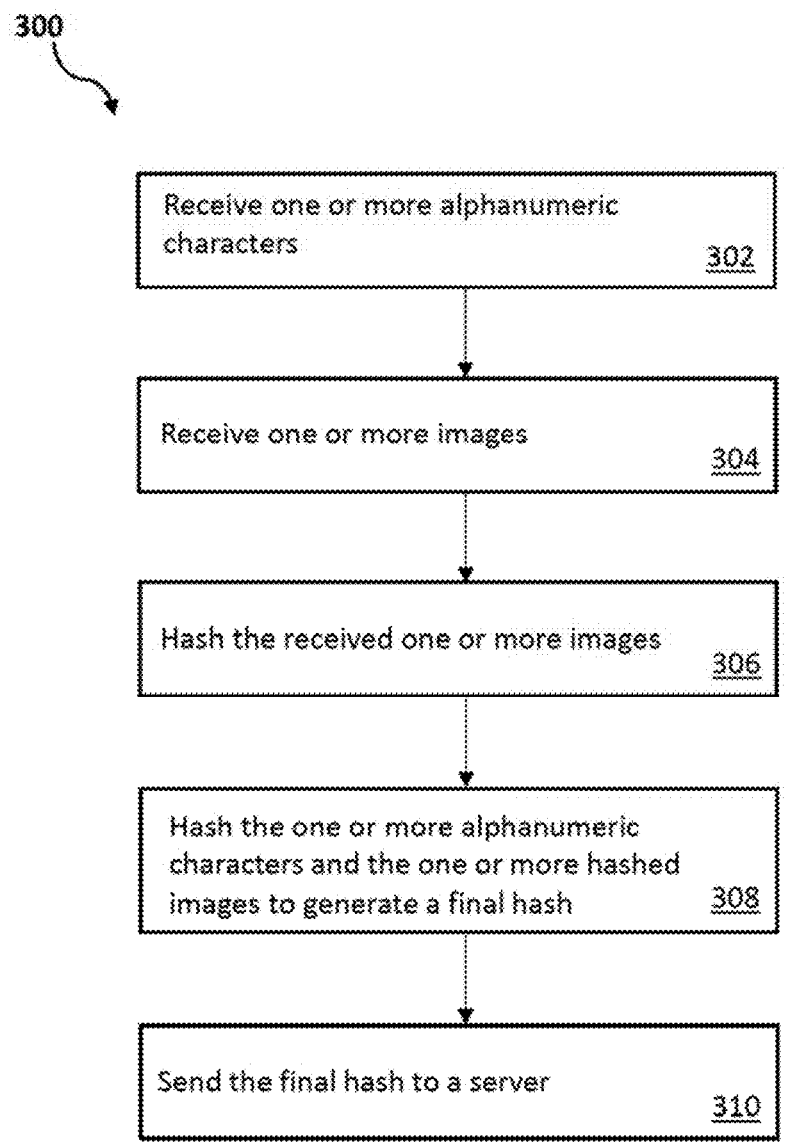
FIG. 3 is an operational flow chart illustrating a process for improving password strength, in accordance with an embodiment of the invention.

Referring now to FIG. 3, an operational flow chart 300 according to at least one embodiment is depicted. The operational flow chart 300 illustrates improving password strength by utilizing the password generation program 110a, 110b, to create a password that may include both images and alphanumeric characters.

At operation 302, one or more alphanumeric characters are received. The user may utilize the input surface 120 to input the alphanumeric characters into the input area 118. The alphanumeric characters may be ascii or utf8 characters. For example, the alphanumeric characters may be letters, numbers, special characters, or a combination thereof. The alphanumeric characters may be upper case or lower case. The alphanumeric characters may be formed into words or phrases. For example, the user may input the following alphanumeric characters: "Password1234". The alphanumeric characters may also be random characters strung together by the user.

At operation 304, one or more images 124a-n are received. Along with the alphanumeric characters, the user may use the image directory 122 to select one or more images 124a-n to input into the input area 118. The one or more images 124a-n may be personal images, such as, for example, the user's personal photos. The images 124a-n may also include public images, such as, for example, images that the user found on the internet.

The images 124a-n may be interspersed between the received alphanumeric characters. For example, the user may decide to add two images 124a-n to the alphanumeric characters "Password1234". The user may decide that the two images 124a-n are going to be right next to each other with no alphanumeric characters separating them. For example, the user may place the two images 124a-n after the alphanumeric characters "Pass" but before the alphanumeric characters "word1234". As such, the result may be the following: "Pass[Image One][Image Two]word1234".

The user may choose the number of images 124a-n the user wants to use for the password. For example, for a bank account password, the user may choose three images 124a-n that may be added to the alphanumeric characters. However, for a social media account password, the user may choose five images 124a-n to add to the alphanumeric characters. In addition, the user may sequence the images 124a-n however the user chooses. For example, for the bank account password, the user may decide to put one image after the second alphanumeric character and the other image before the last alphanumeric character. As such, if the user decides to use "Password" as the alphanumeric characters, then the addition of the two images may result in the following: " "Pa[Image One]sswor[Image Two]d". For the social media account, the user may decide to add the five images sequentially after the last alphanumeric character. As such, if the user decides to use "Password" as the alphanumeric characters, then the addition of the five images may result in the following: "Password[Image One][Image Two] [Image Three][Image Four] [Image Five]".

At operation 306, the received images 124a-n are hashed. The password generation program 110a, 110b may use any type of hash algorithm that may perform the function of hashing the images 124a-n. For example, the password generation program 110a, 110b may utilize perceptual hashing, cryptographic hashing or the combination of both. Both perceptual hashing and cryptographic hashing algorithms may take the received images 124a-n and provide a string of hash values for each of the received images 124a-n. For example, the user decides on the following string of alphanumeric characters and images 124a-n as a password:

"P  sswor  ."

Once the alphanumeric characters and the images 124a-n are received, the images 124a-n are hashed using a hashing algorithm, such as, for example, Secure Hash Algorithm 256 ("SHA-256"). The images 124a-n may be hashed in the order they appear in the password. Each image 124a-n may have its own unique hash value. As such, if one image is used, then the hashing algorithm replaces the image with a hash value corresponding to that image. Continuing with the example from above, since there are two images, then hashing of the two images may produce two hash values. For example, the final string of the alphanumeric characters and the image hashes may be the following:
"P5815028437bf3078114385a0365e60436555d226ceaee9c 1d0cdf461061a6a92sswor6a6d42892e1bcc1c7c60ef4cc9f4 2b9d4a7a328ad10024455695b95cf30411f6".

At operation 308, the one or more alphanumeric characters and the hashed images are hashed to generate a final hash. The password generation program 110a, 110b may utilize perceptual hashing, cryptographic hashing or the combination of both to perform a final hash on the alphanumeric characters and the hashed images. For example, continuing with the example from above, the SHA-256 algorithm may be used to generate the final hash:
"d526cae6fd307cc87caf6c6abab9f33e388654c4e8b0b3a91 62e96fe50fb4dc".

The final hash may correspond to the password that the user created using both alphanumeric characters and images 124a-n. The final hash may also decrease the file size corresponding with the password. In this example, the final hash above corresponds to the following password:

"P  sswor  ".

It should be appreciated that different hashing algorithms may be used to not only hash the images 124a-n but also to hash the alphanumeric characters with the hashed images.

For example, a perceptual hashing algorithm may be used to hash the images 124a-n and a cryptographic hashing algorithm may be used to hash the alphanumeric characters and the hashed images. Utilizing the perceptual hashing algorithm to hash the images 124a-n may be advantageous especially if the images 124a-n are subsequently modified. Slightly modified images 124a-n that have been previously used in a password may still be used during subsequent user re-authentication. For example, the user utilizes an image of a dog to set up a bank account password. During the password generation, the password generation program 110a, 110b may use perceptual hashing to hash the image of the dog. Once the bank account password is set up, the user decides to change the size of the image by compressing it. However, because the modification to the image is minimal and affects the properties of the image but not the actual image itself, the user may still use that modified image to reauthenticate with the bank account. During reauthentication, the user may input the password with the image and the password generation program 110a, 110b, utilizing perceptual hashing, may generate a final hash that is the same as the hash that was generated during account password setup.

As stated above, slight modifications to the images 124a-n, such as for example, size changes, file date changes, may be permissible if a perceptual hashing algorithm is used to hash the images 124a-n. However, if an image 124a-n that has been used for a password is extensively modified or even deleted, the user may have to reset that password, and any other password that included that image. For example, the user used one image to create passwords for a bank account and a retail store account. After the user created these two passwords, the user accidentally deleted the image. Without the image, the password generation program 110a, 110b is unable to create the final hashes for the two accounts that exactly match the hashes that were created during password generation. As such, the user is unable to log into the bank account and the retail store account and may have to utilize a "forgot password" option to enter new passwords for those accounts. Continuing with the same example, instead of deleting the image, the user modifies the colors within the image. Even if perceptual hashing was used to hash the original image and the modified image, because the modification is extensive, the original hash with the hash generated as a result of the modification would not match. As such, the user may have to reset the password utilizing the "forgot password" option.

Once the final hash is generated, the password generation program 110a, 110b moves to operation 310 and sends the final hash to a server. As mentioned above, the final hash is associated with the password that the user created using both alphanumeric characters and images 124a-n. As such, the server receives that final hash that is associated with the user password. The server may be a client server. The client may refer to any entity that the user may have an account with, such as, for example, a bank, a social media, or retail. Once the client server receives the generated password, the client server may then hash the password and store it in its database. During reauthentication, when the client decides to log into a particular account again after the user set up the password with the images, the client server may compare the stored hash with the hash that is sent to the server to determine if the hashes match. If the hashes match, the user may be able to log into the account. If the hashes do not match, the user may have to resubmit the password again.

It should be appreciated that utilizing different hash algorithms may be useful when certain accounts have different password length requirements. For example, the user wants to set up a bank account where the password should conform to the requirements that the bank set up, such as, for example, the use of upper and lower case alphanumeric characters, the length of the password, or the use of special characters. The user chooses the appropriate number of alphanumeric characters, including the images 124a-n, to meet the password length requirement. The password generation program 110a, 110b may then choose a hash algorithm according to the password length requirement.

In an embodiment, the password generation program 110a, 110b may truncate the hash length to meet the password length requirement using known truncation mechanisms. For example, the SHA-256 hash algorithm may be used to create a 256-bit final hash. If a 96-bit final hash is desired, the SHA-256 may truncate the 256 bit final hash to 96 bits. For example, the leftmost 96 bits of the 256-bit generated final hash may be selected by SHA-256 as the truncated final hash, and the rightmost 160 bits of the final hash may be discarded.

It should be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
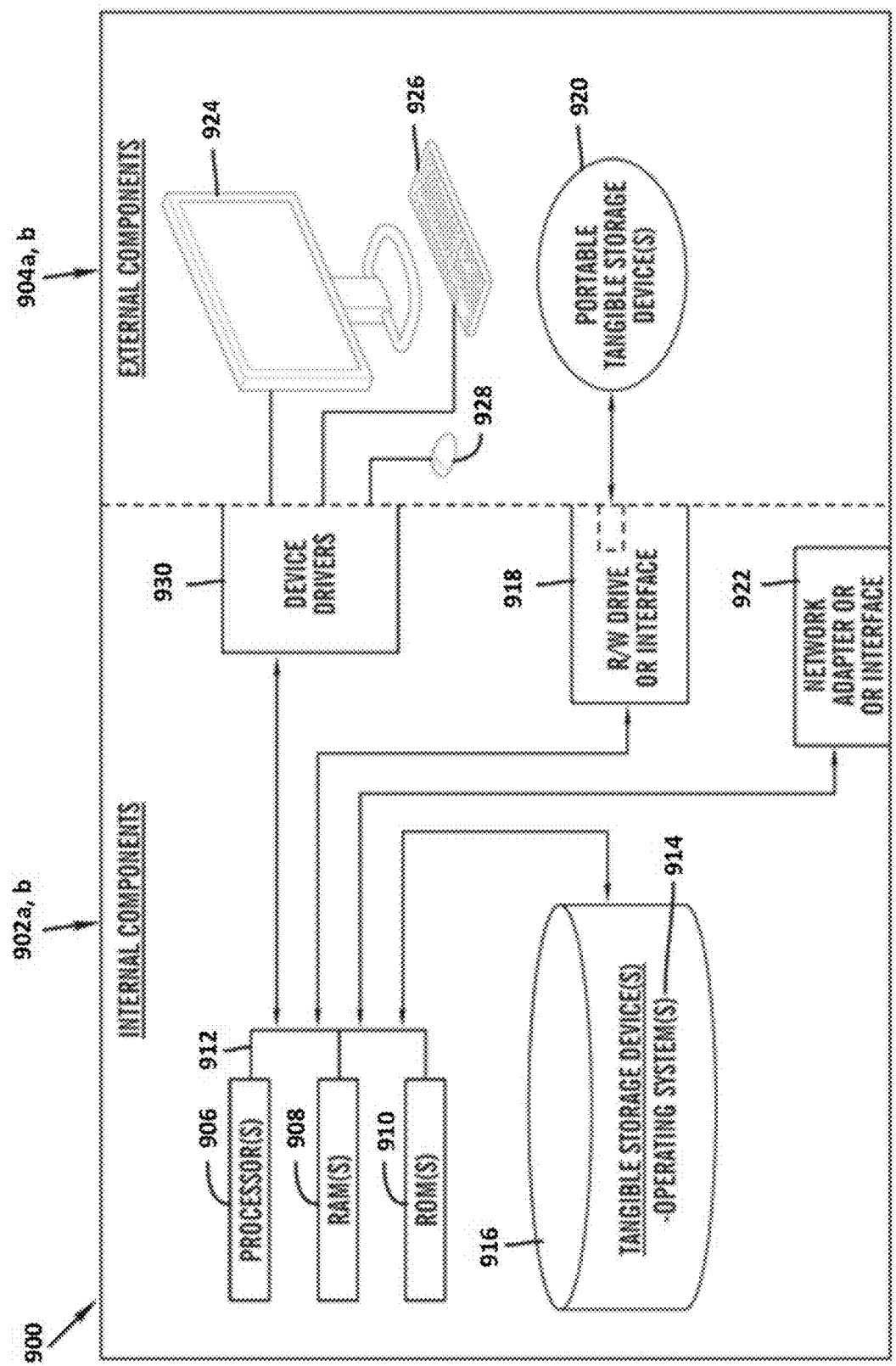
FIG. 4 is a block diagram depicting internal and external components of computers and servers depicted in FIG. 1, in accordance with an embodiment of the invention.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b, and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the password generation program 110a in client computer 102, and the password generation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the password generation program 110a, 110b can be stored on one or more of the respective portable computer-readable tangible storage devices 920, read via the respective R/W drive or interface 918 and loaded into the respective hard drive.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the password generation program 110a in client computer 102 and the password generation program 110b in network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the password generation program 110a in client computer 102 and the password generation program 110b in network server 112 are loaded into the respective hard drive. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems, or storage. The consumer does not manage or control the underlying web-based or cloud-based infrastructure including databases, corpora, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
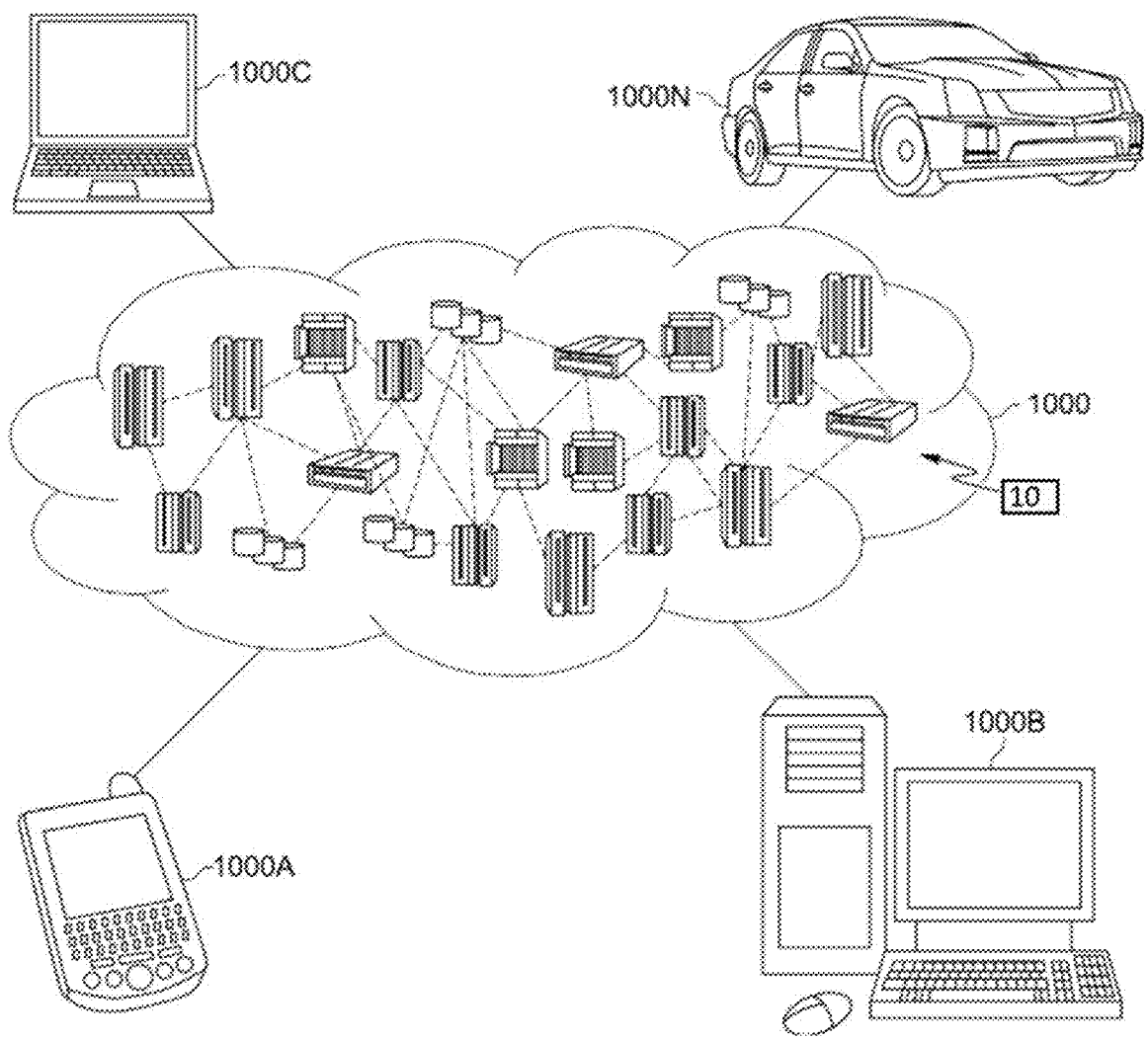
FIG. 5 is a functional block diagram depicting a cloud computing environment including the computer system depicted in FIG. 1, in accordance with an embodiment of the invention.

Referring now to FIG. 5, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 10 and cloud computing environment 1000 can communicate with any type of computerized device over any type of network and/or network addressable connection (e.g., using a web browser).

Figure 6:
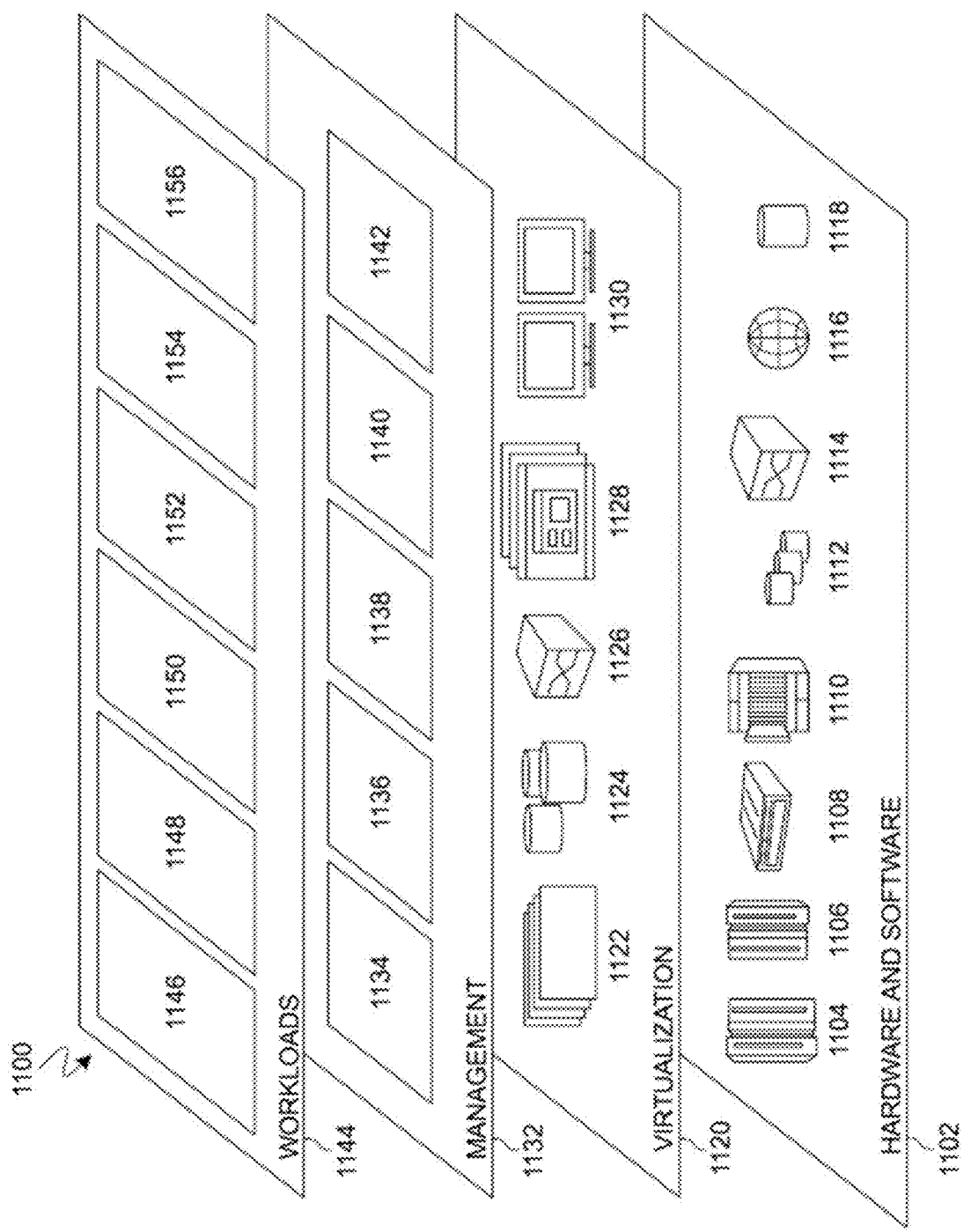
FIG. 6 is a diagram depicting abstraction model layers provided by the cloud computing environment of FIG. 5, in accordance with an embodiment of the invention.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A password generation program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generation of a password with increased password strength, the computer-implemented method comprising:
   receiving one or more alphanumeric characters;
   receiving one or more images;
   using each image entirely in hashing each of the received one or more images separately;
   hashing the one or more alphanumeric characters and combining all the hashes generated separately into a single final hash; and
   reducing the final hash to generate a password.

2. The method of claim 1, further comprising:
   replacing the one or more alphanumeric characters with the one or more images; and sending the generated password to a server.

3. The method of claim 1, further comprising:
   sequencing the one or more images between the one or more alphanumeric characters.

4. The method of claim 1, wherein the hashing algorithm used on each image can be a perceptual hashing algorithm or a cryptographic hashing algorithm and the hashing algorithm used is the same and/or is a different algorithm for each image.

5. The method of claim 1, wherein the password is modified after generation.

6. The method of claim 5, wherein the the password's size is modified or a file data change is altered.

7. The method of claim 1, wherein the one or more images are added at a beginning of the password, before the one or more alphanumeric characters, or the one or more images are added at an end of the password, after a last alphanumeric character.

8. A computer system for generation of a password with increased password strength, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system performs the steps comprising:
   receive one or more alphanumeric characters;
   receive one or more images;
   use each image entirely in hashing each of the received one or more images separately;
   hash the one or more alphanumeric characters and combining all the hashes generated separately into a single final hash; and
   reduce the final hash to generate a password.

9. The computer system of claim 8, further comprising:
   replacing the one or more alphanumeric characters with the one or more images; and
   sending the generated password to a server.

10. The computer system of claim 8, further comprising:
    sequencing the one or more images between the one or more alphanumeric characters.

11. The computer system of claim 8, wherein the one or more images are personal photos of a user.

12. The computer system of claim 8, wherein the hashing algorithm used on each image can be a perceptual hashing algorithm or a cryptographic hashing algorithm and the hashing algorithm used for each image is the same and/or a different algorithm.

13. The computer system of claim 8, wherein the one or more images are added at a beginning of the password, before the one or more alphanumeric characters.

14. The computer system of claim 8, wherein the one or more images are added at an end of the password, after a last alphanumeric character.

15. A computer program product for generation of a password with increased password strength, comprising:
    one or more computer-readable tangible storage media and program instructions stored on at least one of the one or more computer-readable tangible storage media, the program instructions executable by a processor to cause the processor to perform a method comprising:
    receiving one or more alphanumeric characters;
    receiving one or more images;
    using each image entirely in hashing each of the received one or more images separately;
    hashing the one or more alphanumeric characters and combining all the hashes generated separately into a single final hash; and
    reducing the final hash to generate a password.

16. The computer program product of claim 15, further comprising:
    replacing the one or more alphanumeric characters with the one or more images; and
    sending the generated password to a server.

17. The computer program product of claim 15, further comprising:
    sequencing the one or more images between the one or more alphanumeric characters.

18. The computer system of claim 8, wherein the hashing algorithm used on each image can be a perceptual hashing algorithm or a cryptographic hashing algorithm and the hashing algorithm used for each image can be a different algorithm.

19. The computer program product of claim 15, wherein the one or more images replace the one or more alphanumeric characters within the password.

20. The computer program product of claim 15, wherein the one or more images are added at a beginning of the password, before the one or more alphanumeric characters.

\* \* \* \* \*